Figure 1:
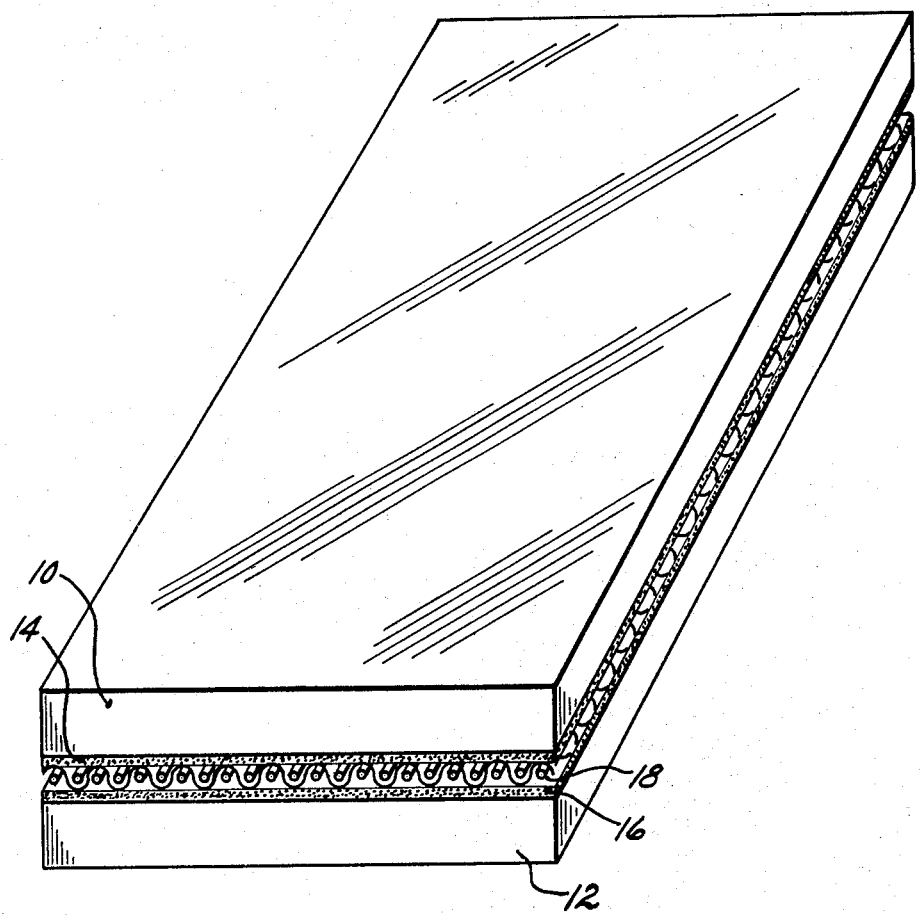

INVENTORS
DWIGHT G. BENNETT
RICHARD M. SPRIGGS
AND HENRY G. LeFORT

CERAMIC ADHESIVE FROM
EXAMPLE 6 USED TO BOND
- TYPE 302 STAINLESS STEEL WITH NO CARRIER
- TYPE 302 STAINLESS STEEL WITH 28 MESH STAINLESS STEEL SCREEN AS A CARRIER
- TYPE 17-7PH STAINLESS STEEL HARDENED TO CONDITION "D" WITH 28 MESH STAINLESS STEEL SCREEN AS A CARRIER

- 800°F
- ROOM TEMPERATURE

INVENTORS
DWIGHT G. BENNETT
RICHARD M. SPRIGGS
AND HENRY G. LeFORT
BY
William J. O'Brien
ATTORNEYS

United States Patent Office 3,144,370
Patented Aug. 11, 1964

3,144,370
METHOD FOR JOINING METALLIC MEMBERS
Dwight G. Bennett, Champaign, Ill., Richard M. Spriggs, Reading, Mass., and Henry G. Lefort, Alamo, Calif., assignors to the United States of America as represented by the Secretary of the Air Force
Filed Aug. 14, 1961, Ser. No. 131,445
3 Claims. (Cl. 156—89)

This invention relates to a method for joining metallic members and more particularly to a method for joining stainless steel or stainless steel alloys by employing ceramic adhesives.

The recent advent of high speed and high altitude aircraft and missiles has created a need for structural bonding materials capable of maintaining their strength and effectiveness at temperatures in the range of 1000° F. The high ambient temperatures encountered during the operation of high speed propulsion devices, as well as the severe stresses and strains imposed upon their integral components, produces an undesirable weakening effect in structural elements joined together by previously well-known bonding materials. The use of organic adhesives has provided unsuitable for elevated temperature applications because of their thermal and oxidative instability at temperatures above about 400° F. The refractory adhesives employed heretofore, although highly resistant to oxidative degradation, are limited in use because of their inherent brittleness, low impact resistance, poor thermal shock resistance, and relatively high maturing temperatures.

Accordingly, it is the primary object of this invention to circumvent the above-described limitations of the prior art by providing a novel method for joining metallic members of the stainless steel type.

Another object of this invention is to provide a novel method for joining metallic members whereby said members exhibit excellent bonding strength at elevated temperatures in the range of 1000° F.

Still another object of this invention is to provide a method for joining metallic members whereby said members exhibit an unexpected improvement in strength stability at elevated temperatures in the range of 1000° F.

A further object of this invention is to provide a novel method for joining metallic members whereby said members become particularly adapted for use in the fabrication of structural components subjected to the high temperature and severe stress operating conditions encountered by high speed aircraft and missiles.

Still a further object of this invention is to provide a novel method for joining metallic members whereby said members exhibit good thermal shock and impact properties, as well as resistance to moisture and oxidative degradation.

Figure 2:
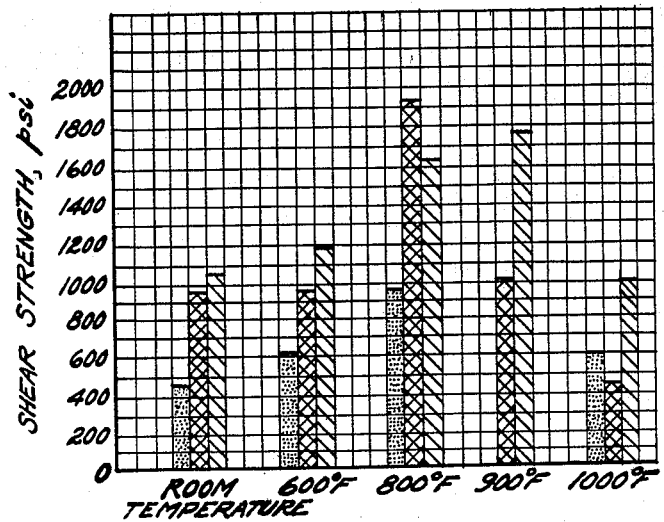
Figure 3:
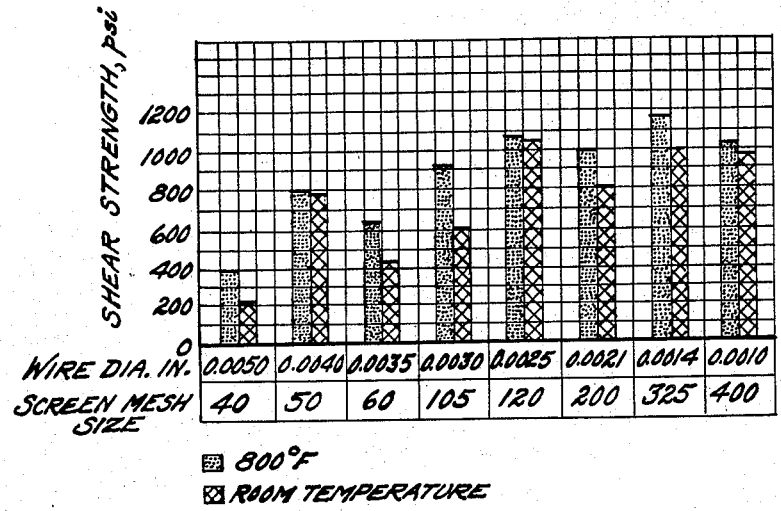

The above and still further objects, advantages and features of this invention will become readily apparent upon consideration of the following detailed description thereof when taken in conjunction with the accompanying drawings, in which:

FIGURE 1 is an exploded isometric end view of two metallic members bonded together in accordance with the teachings of this invention; and FIGURES 2 and 3 are graphical representations disclosing shear strengths achieved by employing the bonding method of this invention.

Briefly, the method of this invention includes the formation of a joined assembly which comprises a pair of metallic members between which is sandwiched a space carrier screen and a ceramic adhesive. The carrier screen is embedded in and forms an integral part of the ceramic adhesive.

In accordance with this invention, it has been found that certain refractory ceramic frits of a range of composition to be disclosed in greater detail hereinafter, when combined with colloidal silica and water produce novel ceramic adhesive compositions which are characterized by an unexpected strength at elevated temperatures. These ceramic adhesives are useful in bonding metal-to-metal, especially stainless steel and alloys of the stainless steel type. Of particular value is the utilization of these adhesives in forming bonded joints in the honeycomb sandwich type of panel construction used for aircraft and missiles.

The ceramic adhesives contemplated by this invention comprise a ceramic refractory frit, colloidal silica or clay, or some other suitable suspending agent and water. These ingredients are mixed together and milled to a very fine condition called a slip. The adhesive slip can then be directly applied to metallic components by dipping or spraying, allowed to dry, and then fired at an elevated temperature to develop the adhesive bond. In general, the adhesive slip comprises about 90 to 110 parts by weight of a ceramic frit, 1 to 3 parts by weight of a suitable suspending agent, and about 30 to 60 parts by weight of water.

The frit component of the ceramic adhesive of this invention is made by melting properly selected ceramic oxides, halides or metals into a glass by smelting the desired mixture in a suitable gas-fired smelter for a sufficient time and at a temperature until a smooth, pliable thread can be drawn from the melt. It is then quenched in water which shatters it and makes it easy to grind in the milling operation. The ground mixture is dried and ground to pass through a 40-mesh sieve. The frit is then ready for mixing with the suspending agent and water. Selection of the frit ingredients is based on the physical properties desired in the frit such as viscosity, thermal expansion, and strength. It was found that the thermal expansion of the adhesive should approach that of the metal in order to obtain high shear strengths. However, it may not be too near to the metal or crazing tendencies may reduce shear strength.

In order to illustrate specific embodiments of this invention, there are presented in Tables I through IV detailed examples of the ceramic adhesive slip, as well as the ceramic frit which forms a component part thereof. The ceramic frit composition may be incorporated into the adhesive slip as a unitary component, or a mixture of frits may be employed.

The composition of the glassy ceramic frits are in the range shown in Table I. Example 1 thereof discloses a range of composition for one type of frit while Example 2 discloses a different and more simple type of frit.

TABLE I

*Ceramic Frit, Parts by Weight*

| Composition | Example | |
|---|---|---|
| | 1 | 2 |
| $SiO_2$ | 23-28 | 37-43 |
| $Al_2O_3$ | 10-15 | |
| $B_2O_3$ | 3-6 | 50-60 |
| $Na_2O$ | 10-20 | 3-7 |
| $K_2O$ | 3-6 | |
| $BaO$ | 4-7 | |
| $ZnO$ | 8-12 | |
| $CaO$ | 4-6 | |
| $Na_2SiF_6$ | 4-6 | |
| $P_2O_5$ | 1-5 | |
| $V_2O_5$ | 1-4 | |
| $Cr_2O_3$ | 0-5 | |
| $Fe_2O_3$ | 0-5 | |

TABLE II

*Ceramic Frit, Parts by Weight*

| Composition | Example | | |
|---|---|---|---|
| | 3 | 4 | 5 |
| $SiO_2$ | 27.2 | 26.7 | 38.0 |
| $Na_2O$ | 16.3 | 16.0 | 5.0 |
| $B_2O_3$ | 4.0 | 3.9 | 57.0 |
| $Al_2O_3$ | 13.0 | 12.7 | |
| $K_2O$ | 5.1 | 5.0 | |
| $BaO$ | 6.0 | 5.9 | |
| $CaO$ | 5.4 | 5.3 | |
| $ZnO$ | 11.0 | 10.8 | |
| $Na_2SiF_6$ | 5.0 | 4.9 | |
| $P_2O_5$ | 4.0 | 3.9 | |
| $V_2O_5$ | 3.0 | 2.9 | |
| $Cr_2O_3$ | | 2.0 | |
| | 100.0 | 100.0 | 100.0 |

Table II above, discloses detailed examples of the ceramic frits contemplated by this invention. The specific chemical ingredients and the amounts thereof come within the range of composition disclosed by Table I.

TABLE III

*Ceramic Frit, Parts by Weight*

| Composition | Example | | |
|---|---|---|---|
| | 3A | 4A | 5A |
| Quartz | | 0.2 | 24.8 |
| $NaNO_3$ | 4.2 | 11.6 | 9.0 |
| Potash feldspar | 34.8 | 32.6 | |
| Borax | 9.2 | 8.6 | |
| Soda ash | 16.5 | 11.0 | |
| $H_3BO_3$ | | | 66.2 |
| $Cr_2O_3$ | | 1.6 | |
| $BaCO_3$ | 0.7 | 1.8 | |
| $ZnO$ | 9.2 | 8.6 | |
| $CaCO_3$ | 8.0 | 7.3 | |
| $Na_2SiF_6$ | 4.2 | 3.9 | |
| $BaO.P_2O_5$ | 6.9 | 6.5 | |
| $V_2O_5$ (88.5%) | 2.5 | 2.6 | |
| Aloxite [1] | 3.8 | 3.7 | |
| | 100.0 | 100.0 | 100.0 |

[1] $Al_2O_3$, dust collector fines.

The raw batch formula for the glassy frit for Examples 3, 4 and 5 respectively, of Table II are presented in Examples 3A, 4A and 5A respectively, of Table III above. The frits disclosed in Tables II and III are made by melting into a glass a selective mixture of various oxides and halides, then quenching the glass in cold water to shatter it, followed by a grinding operation. The frit mixture is then ready to be incorporated into the colloidal silica and water in order to produce a ceramic adhesive.

Specific examples of various ceramic adhesives formed in accordance with the teachings of this invention are presented in Table IV below. Examples 6, 7 and 8 comprise a mixture of the glassy frit from Examples 3, 4 and 5 respectively, as well as colloidal silica and water in the amounts indicated. The ceramic adhesive mixture is milled, usually in a porcelain ball mill in a very fine condition called a slip. The fineness of the slip is such that no more than 4 to 6 percent by weight of the residue is retained on a 200-mesh sieve. The adhesive slip can then be directly applied to metal pieces to be joined together, allowed to dry, and then fired at a temperature between 1000° F. and 2000° F. to develop an adhesive bond.

TABLE IV

*Ceramic Adhesive, Parts by Weight* [1]

| Adhesive example | Frit from— | | Syloid 244,[2] Amt. | Water, Amt. |
|---|---|---|---|---|
| | Exam. | Amt. | | |
| 6 | 3 | 100 | 2 | 50 |
| 7 | 4 | 100 | 2 | 50 |
| 8 | 5 | 100 | 2 | 40 |

[1] All batches were milled to a trace on 200-mesh from a 100 gram sample.
[2] "Syloid" is a colloidal silica slip suspension agent, manufactured by the Davidson Chemical Company, Baltimore 3, Maryland.

Evaluation of the ceramic adhesives of this invention is set forth in Tables V through XIV. Evaluation of the adhesives was accomplished by shear testing ceramic adhesive bonded test specimens in the range of room temperature to 1000° F. A Tinius Olsen super "L" type hydraulic testing machine and a split tube furnace were utilized for this purpose. The split tube furnace was employed to enclose the specimen when it was mounted in the testing machine for the purpose of determining shear strengths at elevated temperatures. The furnace was heated to the test temperature and held at that temperature for 10 minutes in order that it might approach equilibrium. The test specimen was then loaded at 1200 pounds scale reading per minute until failure occurred. The breaking shear stress was doubled to get the shear strength in p.s.i. since the test area of each specimen was only one-half square inch.

A Rockwell "C" hardness tester equipped with a diamond penetrator (Brale) and using a major load of 150 kilograms was used to determine the Rockwell "C" hardness value of the various specimens evaluated for shear strength. Hardness values were obtained on specimens as received, after they had been subjected to various precipitation hardening treatments, and also after they had been tested in shear at 600° F. and 800° F. The Rockwell "C" hardness obtained on as received specimens referred to hereinafter as "condition A" was between 0 and 2.

Types 17–7PH and 302 stainless steel were used to make the test specimens employed in evaluating the ceramic adhesives. The results obtained are based on shear strength values of lap-joined specimens tested at various temperatures in the range of room and 1000° F. The shear test specimens were cut from stainless steel sheet stock as a thin rectangular section measuring 4¼ inches by 1 inch. Each section formed a specimen half and a ½ inch end area of each half was cleaned by sandblasting. The sandblasted end of each half was then coated by dipping in the adhesive to be tested, dried, and then the two coated ends were joined together so that a ½ inch overlap resulted. The lap-joined specimen, either singly or in a stack of multiple pieces, were then placed on a stainless steel firing rack. A static cure pressure of 50 p.s.i. was applied to the stack in the direction perpendicular to the individual planes of the overlapped coated ends by means of a suitable dead weight. The specimens were fired for about 20 minutes at about 1750° F. under the cure pressure so that the glassy adhesive particles in the ceramic adhesive softened and fused together, to the metal, and any screen carrier or similar carrier used directly in the adhesive material, thus forming a continuous glassy matrix phase. The specimens were then allowed to cool in place to room temperature. Specimens of type 302 stainless steel were then ready for shear shrength testing but it was necessary to further heat treat type 17-7PH stainless steel to precipitation harden it before shear strength testing. It was unexpectedly found that the ceramic adhesives of this invention are especially adapted for application during the heat hardening treatment of such steels since the maturing temperature of these adhesives fall within the specifications for the heat hardening treatment for type 17-7PH stainless steel.

Various heat hardening treatments were utilized in precipitation hardening the shear strength test specimens of type 17-7PH stainless steel. The stainless steel was obtained from the supplier in "condition A" which is mostly austenite, annealed at 1950° F. plus or minus 25° F. and air cooled. The specification for the first type of heat treatment, hereinafter referred to as "condition B," comprises the steps of heating the metal to 1400° F. plus or minus 25° F. for 90 minutes, then cooling it to 60° F. within one hour after removal from the furnace. After cooling the metal was then hardened at 1050° F. plus or minus 10° F. for 90 minutes, followed by air cooling to room temperature. The second type of heat treatment, hereinafter referred to as "condition C," was similar in all respects to heat treatment "condition B," except that the specimen was hardened at 950° F. plus or minus 10° F. for 30 minutes followed by air cooling to room temperature. The third type of heat hardening treatment, hereinafter referred to as "condition D," comprises the steps of heating the metal to 1750° F. plus or minus 15° F. for 20 minutes, cooling to 60° F. within one hour after removal from the furnace, then cooling the metal to −100° F. and holding it at that temperature for eight hours. The metal was then hardened at 950° F. plus or minus 10° F. for one hour, followed by air cooling to room temperature. It is to be particularly noted that the first step in the "condition D," hardening treatment permits the application of the ceramic adhesive completely within the time temperature limits for that treatment.

In accordance with the method of this invention, a screen carrier is embedded right in the adhesive bond. The screen becomes an integral part of the adhesive joint and results in considerable improvement in shear strength and other physical properties over that achieved without the use of a carrier screen. The process of bonding metal-to-metal using an adhesive with or without a carrier is well-known. However, the process of the instant invention which employs a particular type of ceramic adhesive as a bonding medium, as well as a specific curing pressure, curing temperature and curing time, produces an adhesive bond which is composed of a continuous glassy phase of high strength within the bond itself and, in addition, causes an interaction of this glassy phase with the metal to be bonded as well as the screen carrier. The glassy phase adheres very tightly to the metal as a result of the interaction thereby producing high strength and strength retention under conditions of high temperature. A series of regular mesh stainless steel screens of varying mesh fineness and wire diameter, as well as a quartz microfiber paper, can be utilized as the screen carrier. It has been found that a stainless steel space carrier screen having a 1/32 inch space with a 4 mil wire diameter, designated as a 28-mesh space screen, acted to produce higher shear strengths than regular mesh stainless steel screen of a mesh fineness up to 400.

As is shown in FIGURE 1, the metallic members 10 and 12 are bonded together by ceramic adhesive layers 14 and 16. A space screen carrier 18 is embedded between the adhesive layers 14 and 16 and forms an integral part of the bonded joint after the metallic members 10 and 12 are joined together. The metallic members 10 and 12 may be of any desired configuration but for purposes of illustration are shown as plates or the like. The metallic members may be stainless steel or stainless steel alloys. The adhesive layers 14 and 16 which form the bonding agency between metallic members 10 and 12 takes the form of a "slip," as disclosed hereinbefore, and can be applied to the metallic members by spraying, painting, dipping or brushing and allowed to dry. The metallic members, after application of the ceramic adhesive and screen carrier, are placed in a stainless steel rack, either singly or in multiple pieces to form a stack. A static pressure of 50 p.s.i. is then applied perpendicular to the plane of the metallic members 10 and 12 at a temperature between 1000° F. and 2000° F., preferably about 1750° F., for about 20 minutes in order to develop a rigid adhesive bond. The bonded members are then cooled, in place, to room temperature.

Referring to FIGURES 2 and 3 there are disclosed the shear strengths achieved by using various types of screen carriers for bonding types 302 and 17-7PH stainless steel with the ceramic adhesive of Example 6. The stippled bars of FIGURE 2 disclose the shear strength for type 302 stainless steel bonded with the adhesive of Example 6 without the use of a screen carrier. Results achieved by utilizing a screen carrier right in the adhesive bond are also disclosed in FIGURE 2 for both types 302 and 17-7PH stainless steel. The specimens of type 302 stainless steel were given the same adhesive firing treatment as the specimens that contained no carrier. It can be seen by an examination of FIGURE 2 that the use of a 28-mesh space screen carrier increased shear strength almost two-fold at all temperatures up to 800° F. The specimens that used a carrier showed the same tendency as the noncarrier specimens of increasing in shear strength as the test temperature increased up to 800° F. A further examination of FIGURE 2 discloses that 17-7PH stainless steel specimens gave higher shear strengths than type 302 specimens at all temperatures except 800° F. and especially at 900° F. where type 17-7PH stainless steel specimens reached a maximum in shear strength of 1750 p.s.i.

A series of regular mesh stainless steel screen carriers of varying mesh fineness and wire diameter were used with type 302 stainless steel test specimens bonded with the adhesive of Example 6. Shear strength tests were made at room temperature and at 800° F. and these results are presented in FIGURE 3. As is disclosed by an examination of FIGURE 3, the screen carriers acted to generally increase shear strength as the mesh became finer and the wire diameter smaller. Screen carriers of 120 to 400 mesh had about the same effect on shear strength but none of these were as effective as the 28-mesh stainless steel space screen.

The ceramic adhesive of Example 6 was also subjected to stress rupture tests. Type 302 stainless steel was bonded with the adhesive and a 28-mesh stainless steel space screen was employed as a carrier. Stress rupture data was obtained by using Krouse stress rupture racks. The specimens were held at predetermined temperatures and loads and the time required for the specimens to fail was observed. The ceramic adhesive of Example 6 withstood 700 p.s.i. for 171 hours at room temperature with no failure occurring. At 600° F. this adhesive withstood 600 p.s.i. for 500 hours without failure.

TABLE V

*Shear Strength and Rockwell "C" Hardness*

| Ceramic adhesive | Temp. of Test, °F. | Adhesive thickness, mils | Shear strength, p.s.i. | Rockwell "C" Hardness No. | |
|---|---|---|---|---|---|
| | | | | Before test | After test |
| Example 6 | Room | 7 | 680 | 35 | 35 |
| Example 6 | Room | 8 | 660 | 37 | 37 |
| Average | | | 670 | | |
| Example 6 [1] | 600 | | | 37 | 38 |
| Example 6 | 600 | 9 | 860 | 37 | 38 |
| Example 6 | 800 | 8 | 860 | 36 | 37 |
| Example 6 | 800 | 8 | 860 | 37 | 38 |
| Average | | | 860 | | |

[1] Specimen broke on removal from furnace due to rough handling.

The shear strength tests for the ceramic adhesive of Example 6, set forth in Table V above, were determined on shear type specimens of type 17-7PH stainless steel which were hardened to "condition B" after first being fired at 1750° F. for 20 minutes. Firing the specimens at 1750° F. may have changed them from the as received "condition A"; however, they were given the hardening treatment that would ordinarily produce "condition B" from "condition A." The shear strength values for the ceramic adhesives for Example 6 were not greatly increased as a result of the hardening treatment employed. Highs of 680 p.s.i. at room temperature, 860 p.s.i. at 600° F. and 800° F. were realized. A 28-mesh stainless steel space screen was employed as a carrier.

Shear strength values for ceramic adhesives of Examples 6 and 7 which had been applied during the "condition D" heat treatment appeared to be increased due to the hardening treatment. High shear strength values of 1000 p.s.i. at room, 1400 p.s.i. at 600° F. and 4000 p.s.i. at 800° F. were achieved with the adhesive of Example 6. The adhesive of Example 7 gave high shear strength values of 960 p.s.i. at room temperature, 1500 p.s.i. at 600° F. and 1800 p.s.i. at 800° F. The Rockwell "C" hardness values for these specimens varied between 43 and 46 before shear strength tests and between 44 and 47 after shear strength tests at elevated temperature. These results are set forth in Table VI below.

The adhesives were applied to the sandblasted ends of the specimens of Table VI by dipping the ends in each adhesive respectively and drying at 200° F. The specimens were then fired for 20 minutes at 1750° F. as part of the hardening treatment necessary to reach "condition D" with a cure pressure of 50 p.s.i. and with the use of a 28-mesh stainless steel space screen carrier. The specimens were then given the remaining hardening treatment to reach "condition D" and then tested in shear at room temperature, 600° F. and 800° F.

TABLE VI

*Shear Strength and Rockwell "C" Hardness of Ceramic Adhesives Applied on Type 17-7PH Stainless Steel Hardened to "Condition D"*

| Ceramic adhesive | Temp. of Test, °F. | Adhesive thickness, mils | Shear strength, p.s.i. | Rockwell "C" Hardness No. | |
|---|---|---|---|---|---|
| | | | | Before test | After test |
| Example 6 | Room | 6 | 1,000 | 44 | 44 |
| Example 6 | Room | 7 | 860 | 45 | 45 |
| Average | | | 930 | | |
| Example 6 | 600 | 7 | 1,400 | 45 | 46 |
| Example 6 | 600 | 7 | 1,300 | 46 | 46 |
| Average | | | 1,350 | | |
| Example 6 | 800 | 7 | 1,400 | 45 | 47 |
| Example 6 | 800 | 7 | 4,000 | 45 | 46 |
| Average | | | 2,700 | | |
| Example 7 | Room | 7 | 960 | 46 | 46 |
| Example 7 | Room | 7 | 960 | 45 | 45 |
| Average | | | 960 | | |
| Example 7 | 600 | 7 | 1,500 | 46 | 45 |
| Example 7 | 600 | 7 | 1,500 | 43 | 45 |
| Average | | | 1,500 | | |
| Example 7 | 800 | 8 | 1,200 | 46 | 44 |
| Example 7 | 800 | 7 | 1,800 | 45 | 45 |
| Average | | | 1,500 | | |

A comparison of Tables V and VI indicates that the ceramic adhesive of Example 6 will give higher shear strength and hardness values on type 17-7PH stainless steel specimens hardened to "condition D" than it will on the same steel hardened to "condition B." It also indicates that any inversions taking place in the stainless steel during hardening to not adversely affect the shear strength when using the adhesive of Example 6. The adhesive of Example 7 was also improved strengthwise by hardening the metal to "condition D."

TABLE VII

*Shear Strength and Rockwell "C" Hardness of Ceramic Adhesives Applied on Type 17-7PH Stainless Steel Hardened to "Condition D" Using a 28-Mesh Stainless Steel Space Screen Carrier*

| Ceramic adhesive | Temp. of Test, °F. | Adhesive thickness, mils | Shear strength, p.s.i. | Rockwell "C" Hardness No. | |
|---|---|---|---|---|---|
| | | | | Before test | After test |
| Example 8 | Room | 6 | 1,500 | 46 | 46 |
| Example 8 | Room | 7 | 1,360 | 46 | 45 |
| Average | | | 1,430 | | |
| Example 8 | 600 | 7 | 1,400 | 46 | 47 |
| Example 8 | 600 | 7 | 1,540 | 46 | 46 |
| Average | | | 1,470 | | |
| Example 8 | 800 | 8 | 2,200 | 46 | 47 |
| Example 8 | 800 | 7 | 3,000 | 46 | 47 |
| Average | | | 2,600 | | |
| Example 6 | Room | 7 | 1,390 | 46 | 48 |
| Example 6 | Room | 7 | 1,250 | 46 | 47 |
| Average | | | 1,320 | | |
| Example 6 | 600 | 6 | 1,270 | 45 | 47 |
| Example 6 | 600 | 7 | 1,210 | 46 | 47 |
| Average | | | 1,240 | | |
| Example 6 | 800 | 7 | 2,150 | 46 | 48 |
| Example 6 | 800 | 7 | 1,270 | 46 | 47 |
| Average | | | 1,710 | | |

The ceramic adhesive of Example 8 was designed to have a low maturing temperature in the range of 1300° F. to 1500° F., a high thermal expansion as close as practical to the expansion of type 17-7PH stainless steel, and to be sufficiently reactive with the metal to produce a strong adhesive bond. The test specimen ends of type 17-7PH stainless steel were sandblasted, dipped in the adhesive, dried for one hour at 200° F. and fired for 20 minutes at 1750° F. with a cure pressure of 50 p.s.i. using a 28-mesh stainless steep space screen carrier. Specimens were then given the remaining heat treatment required to obtain "condition D." Shear strength tests were conducted at room temperature, 600° F. and 800° F. Rockwell "C" hardness values were also determined before and after shear strength testing. The results of these tests are set forth in Table VII, above. The adhesive of Example 8 gave relatively good shear strength values as can be seen by comparison of the results set forth in Table VII for the adhesive of Example 6. It is believed that the $B_2O_3$ content extended the maturing range and therefore the specimens were not over-fired during the 20 minutes of heating at 1750° F.

TABLE VIII

*Shear Strength and Rockwell "C" Hardness of Ceramic Adhesive applied on Type 17–7PH Stainless Steel*

| Ceramic adhesive | Temp. of Test, ° F. | Adhesive thickness, mils | Shear strength, p.s.i. | Rockwell "C" Hardness No. | |
|---|---|---|---|---|---|
| | | | | Before test | After test |
| Example 8 | 1,000 | 6 | 250 | 46 | 38 |
| Example 8 | 1,000 | 6 | 710 | 45 | 42 |
| Average | | | 480 | | |
| Example 7 | Room | 6 | 910 | 47 | 46 |
| Example 7 | Room | 6 | 970 | 45 | 44 |
| Average | | | 940 | | |
| Example 7 | 600 | 7 | 1,660 | 45 | 45 |
| Example 7 | 600 | 6 | 1,380 | 46 | 46 |
| Average | | | 1,520 | | |
| Example 7 | 800 | 6 | 1,450 | 46 | 45 |
| Example 7 | 800 | 7 | 1,420 | 47 | 44 |
| Average | | | 1,435 | | |
| Example 7 | 1,000 | 6 | 750 | 46 | 40 |
| Example 7 | 1,000 | 7 | 690 | 47 | 41 |
| Average | | | 720 | | |

Table VIII also sets forth shear strength values of the ceramic adhesives from Examples 6 and 8 and includes results obtained at test temperatures of 1000° F. The test specimens of Table VIII were prepared in the same manner as those for Table VII. A 28-mesh stainless steel space screen was used with all test specimens and the adhesives were applied during the hardening treatment required to obtain "condition D" from "condition A." The adhesive of Example 6 was prepared from a new adhesive slip in order to insure the reproducibility of previous test results.

Table IX sets forth shear strength results obtained by using the ceramic adhesive from Example 8. The adhesive was applied to sandblasted shear strength specimens of type 17–7PH stainless steel during the hardening treatment required to reach "condition C" from "condition A." The specimens were dipped in the adhesive, dried at 200° F. for one hour and then fired at 1400° F. for 90 minutes with a cure pressure of 50 p.s.i., cooled to room temperature and reheated to 950° F. for 30 minutes. A 28-mesh stainless steel space screen was used as a carrier. The Rockwell "C" hardness values were determined before and after shear testing, and shear testing was conducted at room temperature, 600° F. and 1000° F. Ceramic adhesives of Example 8 when applied before the hardening treatment required to reach "condition C" matured to a glossy bond. It did not, however, give as high a shear strength when applied before the "condition C" hardening treatment as it did when applied before the "condition D" hardening treatment. A comparison of Tables IX and VII give the shear strength values of these specimens given the two different heat treatments and the results vary in the same manner as the temperature increases. However, the values for the specimens given the "condition C" hardening treatment are of a lower magnitude. The Rockwell "C" hardness values averaged about two points less for the "condition C" hardening treatment than for the "condition D" hardening treatment. However, after shear strength testing at 1000° F. the Rockwell "C" hardness value dropped by about five points for specimens given either heat treatment.

TABLE IX

*Shear Strength Tests of a Ceramic Adhesive Applied on Type 17–7PH Stainless Steel and the Rockwell "C" Hardness Number for the Steel*

| Ceramic adhesive | Temp. of Test, ° F. | Adhesive thickness, mils | Shear strength, p.s.i. | Rockwell "C" Hardness No. | |
|---|---|---|---|---|---|
| | | | | Before test | After test |
| Example 8 | Room | 6 | 560 | 43 | 42 |
| Example 8 | Room | 6 | 540 | 44 | 44 |
| Example 8 | Room | 5 | 540 | 45 | 44 |
| Average | | | 545 | | |
| Example 8 | 600 | 6 | 300 | 45 | 45 |
| Example 8 | 600 | 5 | 320 | 44 | 45 |
| Example 8 | 600 | 8 | 680 | 44 | 45 |
| Average | | | 430 | | |
| Example 8 | [1] 800 | 6 | | 44 | |
| Example 8 | 800 | 6 | 770 | 44 | 45 |
| Example 8 | 800 | 6 | 1,060 | 43 | 45 |
| Average | | | 915 | | |
| Example 8 | 1,000 | 6 | 80 | 45 | 41 |
| Example 8 | 1,000 | 5 | 140 | 45 | 39 |
| Average | | | 110 | | |

[1] Broken while adjusting specimen grips.

TABLE X

*Shear Strength Tests of a Ceramic Adhesive Using a 28-Mesh Stainles Space Screen as a Carrier Applied on Type 17–7PH Stainless Steel During Hardening to "Condition D" and the Rockwell "C" Hardness Number of the Hardened Stainless Steel Specimens*

| Ceramic adhesive | Temp. of Test, ° F. | Adhesive thickness, mils | Shear strength, p.s.i. | Rockwell "C" Hardness No. | |
|---|---|---|---|---|---|
| | | | | Before test | After test |
| Example 6 | Room | 7 | 860 | 45 | 45 |
| Example 6 | Room | 6 | 970 | 45 | 45 |
| Example 6 | Room | 7 | 1,030 | 45 | 45 |
| Example 6 | Room | 7 | 1,090 | 45 | 45 |
| Average | | | 990 | | |
| Example 6 | 600 | 6 | 960 | 44 | 45 |
| Example 6 | 600 | 7 | 1,070 | 45 | 46 |
| Example 6 | 600 | 6 | 1,050 | 45 | 46 |
| Example 6 | 600 | 7 | 1,070 | 45 | 46 |
| Average | | | 1,040 | | |
| Example 6 | 800 | 6 | 1,070 | 45 | 46 |
| Example 6 | 800 | 7 | 1,070 | 43 | 43 |
| Example 6 | 800 | 6 | 1,000 | 46 | 46 |
| Example 6 | 800 | 6 | 1,000 | 47 | 47 |
| Average | | | 1,035 | | |
| Example 6 | 900 | 6 | 1,830 | 46 | 46 |
| Example 6 | 900 | 6 | 1,210 | 46 | 47 |
| Example 6 | 900 | 6 | 2,220 | 46 | 47 |
| Average | | | 1,750 | | |
| Example 6 | 1,000 | 7 | 1,160 | 46 | 44 |
| Example 6 | 1,000 | 7 | 800 | 45 | 45 |
| Average | | | 980 | | |

TABLE XI

*Shear Strength Tests of a Ceramic Adhesive Using Quartz Microfiber Paper as a Carrier on Type 17–7PH Stainless Steel Hardened to "Condition D" and the Rockwell "C" Hardness Number of the Hardened Stainless Steel Specimens*

| Ceramic adhesive | Temp. of Test, °F. | Adhesive thickness, mils | Shear strength, p.s.i. | Rockwell "C" Hardness No. | |
|---|---|---|---|---|---|
| | | | | Before test | After test |
| Example 6 | Room | 4 | 890 | 45 | 45 |
| Example 6 | Room | 3 | 1,080 | 46 | 46 |
| Average | | | 980 | | |
| Example 6 | 600 | 4 | 950 | 46 | 45 |
| Example 6 | 600 | 5 | 890 | 46 | 45 |
| Average | | | 920 | | |
| Example 6 | 800 | 5 | 1,000 | 46 | 46 |
| Example 6 | 800 | 4 | 710 | 45 | 46 |
| Average | | | 850 | | |

Tables X and XI, above, set forth further shear strength tests of the adhesive from Example 6 using a 28-mesh stainless steel space screen carrier and a quartz microfiber paper carrier. The specimens were tested in shear at temperatures up to 1000° F. and Rockwell "C" hardness numbers were determined before and after shear testing. An examination of Table X discloses that shear strength values of 990 p.s.i. at room temperature, 1040 p.s.i. at 600° F., 1035 p.s.i. at 800° F., 1750 p.s.i. at 900° F., and 980 p.s.i at 1000° F, were obtained on shear specimens of type 17–7PH stainless steel hardened to "condition D." Room temperature test results for specimens using a quartz microfiber paper as a carrier approached the shear strength values for the specimens using a 28-mesh stainless steel space screen as a carrier as is indicated by a comparison of the results set forth in Tables X and XI. However, shear strength for the quartz paper carrier was about 100 p.s.i. lower at 600° F. and 800° F. than for the specimens using the 28-mesh stainless steel space screen as a carrier. Therefore, it is indicated that the use of a metal screen as a carrier will result in higher shear strengths than carriers such as quartz microfiber paper, especially when using the ceramic adhesives of Example 6.

TABLE XII

*Shear Strength Tests of a Ceramic Frit Film Applied on Type 17–7PH Stainless Steel During Hardening to "Condition D" and the Rockwell "C" Hardness Number of the Hardness Stainless Steel Specimen*

| Ceramic adhesive | Temp. of Test, °F. | Adhesive thickness, mils | Shear strength, p.s.i. | Rockwell "C" Hardness No. | |
|---|---|---|---|---|---|
| | | | | Before test | After test |
| Example 4 | Room | <1>0 | 670 | 45 | 44 |
| Example 4 | 600 | <1>0 | 200 | 46 | 46 |
| Example 4 | 600 | <1>0 | 400 | 45 | 46 |
| Average | | | 300 | | |
| Example 4 | 800 | <1>0 | 840 | 45 | 46 |
| Example 4 | 800 | <1>0 | 360 | 46 | 47 |
| Average | | | 600 | | |

Table XII, above sets forth the results obtained when an attempt was made to fabricate a very thin layer of glass that could be used as an adhesive. The adhesive frit of Example 4 was resmelted in a small crucible. A ceramic tube was inserted in the melt and a molten gob of glass was collected on its end. This gob was then blown into bubbles of very thin wall thickness. The resulting films of glass were used as adhesives in sandblasted lap joint shear specimens which were fired for 20 minutes at 1750° F. with a cure pressure of 50 p.s.i. The specimens were then given the remaining hardening treatment necessary to reach "condition D." Test results are set forth in Table XII. An examination of Table XII discloses that the shear specimens bonded with thin films of the ceramic frit from Example 4 and hardened to "condition D" gave shear strength values of 670 p.s.i. at room temperature, 300 p.s.i. at 600° F. and 600 p.s.i. at 800° F. An examination of the specimens after shear testing disclosed that the area of contact between the adhesive and metal was much less than the half-inch overlap area. Apparently the film of glass drew up into a smaller area due to surface tension at the maturing temperature of the adhesive. This indicates that if the thin film of glass could be bonded to the metal over the entire half-inch overlap area, much higher shear strengths would result with the use of such very thin films of adhesives.

Shear strength test results of the ceramic adhesive of Example 6 using fine and coarse mesh sintered strands of stainless steel as carriers to bond type 17–7PH stainless steel are set forth in Table XIII, below.

TABLE XIII

*Shear Strength Tests of a Ceramic Adhesive Applied on Type 17–7PH Stainless Steel Using Sintered Stainless Steel Fiber Sheet Carriers and the Rockwell "C" Hardness Number for the Steel*

| Specimen No.[1] | Ceramic adhesive | Temp. of test, °F. | Adhesive thickness, mils | Shear strength, p.s.i. | Rockwell "C" Hardness No. | |
|---|---|---|---|---|---|---|
| | | | | | Before test | After test |
| 1 | Example 6 | Room | 7 | 890 | 46 | 46 |
| 2 | Example 6 | Room | 7 | 1,200 | 47 | 47 |
| Average | | | | 1,045 | | |
| 3 | Example 6 | 600 | 10 | 1,080 | 46 | 47 |
| 4 | Example 6 | 600 | 11 | 1,040 | 46 | 45 |
| Average | | | | 1,060 | | |
| 5 | Example 6 | 800 | 13 | 3,230 | 46 | 45 |
| 6 | Example 6 | 800 | 10 | 2,870 | 47 | 45 |
| Average | | | | 3,050 | | |
| 7 | Example 6 | 1,000 | 12 | 50 | 47 | 39 |
| 8 | Example 6 | 1,000 | 10 | 60 | 46 | 39 |
| Average | | | | 55 | | |
| 9 | Example 6 | Room | 8 | 1,330 | 46 | 46 |
| 10 | Example 6 | Room | 9 | 1,250 | 46 | 45 |
| Average | | | | 1,290 | | |
| 11 | Example 6 | 600 | 7 | 1,290 | 46 | 45 |
| 12 | Example 6 | 600 | 8 | 1,500 | 47 | 46 |
| Average | | | | 1,395 | | |
| 13 | Example 6 | 800 | 9 | 2,960 | 46 | 45 |
| 14 | Example 6 | 800 | 8 | 1,730 | 47 | 46 |
| Average | | | | 2,345 | | |
| 15 | Example 6 | 1,000 | 8 | 430 | 46 | 39 |
| 16 | Example 6 | 1,000 | 9 | 360 | 45 | 38 |
| Average | | | | 395 | | |

[1] Specimens 1 through 8 used stainless steel fiber sheets with fine voids and specimens 9 through 16 used stainless steel fiber sheets with larger voids as a carrier.

The fine and coarse mesh carriers were made of sintered strands of type 340 stainless steel. The test specimens were given the heat treatment required to obtain "condition D" and then tested for shear as well as Rockwell "C" hardness. The shear strength values using a sintered stainless steel carrier were, in general, somewhat higher than the values for this adhesive using a 28-mesh stainless steel space screen carrier as can be determined by comparing with the results of Table X. The only significant increase in shear strength, however, was at 800° F.

when using the stainless steel sintered carrier where 3050 p.s.i. was recorded compared to 1035 p.s.i. when using a 28-mesh space screen carrier. The coarser mesh sintered stainless steel carrier gave a few hundred p.s.i. lower value at room temperature and at 600° F. than the finer mesh sintered carrier, but gave 700 p.s.i. lower at 800° F. than the fine mesh sintered carrier. In general, this would indicate that a sintered stainless steel carrier is as effective in increasing shear strength as is the 28-mesh stainless steel space screen when using an adhesive of the type set forth in Example 6.

TABLE XIV

*Elevated Temperature Stress Rupture Data for Ceramic Adhesive of Example 6 Applied on Type 17–7PH Stainless Steel*

| Specimen No.[1] | Temp. of test, °F. | Adhesive thickness,[2] mils | Stress,[3] p.s.i. | Time for failure, hours | Shear strength, p.s.i. | Rockwell "C" Hardness No. | |
|---|---|---|---|---|---|---|---|
| | | | | | | Before test | After test |
| 1 | 900 | 6 | 700 | 136.1 | | 46 | 46 |
| 2 | 800 | 6 | 700 | [4] 1,000 | [5] 1,470 | 47 | 50 |
| 3 | 800 | 6 | 800 | [4] 1,000 | 1,990 | 46 | 50 |

[1] All specimens used a 28-mesh stainless steel space screen as a carrier.
[2] The ceramic adhesive was applied during the hardening treatment required to obtain "condition D" from "condition A."
[3] Two specimens broke during application of a 1,000 p.s.i. load.
[4] Completed.
[5] Specimens 2 and 3 were pulled in shear at 800° F. after they had completed 1,000 hours in stress-rupture.

Stress rupture tests for the ceramic adhesive of Example 6 are set forth in Table XIV, above. Shear test specimens of type 17–7PH stainless steel were bonded with the adhesive and then subjected to the stress rupture tests. Stress rupture data were accumulated at 800° F. and 900° F. by means of Krouse stress rupture racks. The load was applied to the specimens, mounted in the stress rupture rack, at a uniform rate up to the desired shear level, by means of a hydraulic jack which supported the load before its application to the shear specimen. In the stress rupture test, the ceramic adhesive of Example 6 when used to bond 17–7PH stainless steel hardened to "condition D," withstood a 700 p.s.i. static load for 136 hours at 900° F. before failure. Another test specimen was retired after completing 1000 hours under a load of 700 p.s.i. at 800° F. It was then tested in shear at 800° F. and developed 1470 p.s.i. before failure. Since this value is representative of this adhesive at 800° F., it is indicated that the static load of 700 p.s.i. at 800° F. did not affect the structure of the adhesive bond. A third specimen completed 1000 hours under a load of 800 p.s.i. at 800° F. without failure. This specimen later developed 1,900 p.s.i. in shear at 800° F. before failure. All of the test specimens when subjected to stress rupture tests broke when a load of 1000 p.s.i. was applied at room temperature. Even though the load was applied to the specimen very slowly, by means of the hydraulic jack, failure still occurred. It can be noted from an examination of FIGURE 2 that specimens of type 17–7PH stainless steel prepared in a similar manner using the same constituents had an average breaking shear strength of 1060 p.s.i. at room temperature. Failure during the stress rupture testing may have been due to attempting to apply a load (1000 p.s.i.) which was too near to the average breaking shear strength values for these specimens.

It will be seen from the above test data that the present invention provides novel refractory ceramic adhesives that are especially resistant to elevated temperature and, in addition, are capable of maintaining their resistance to high temperatures for extended periods of time. The ceramic adhesives of this invention can be succesfully employed for bonding stainless steel and stainless steel alloys, and in particular, can be applied during the precipitation harden treatment necessary to harden type 17–7PH stainless steel. The unexpected increase in shear strength for bonded joints employing the adhesives of this invention has proved to be of special value when the adhesive is employed in bonding structural components that the subjected to the stress and elevated temperature conditions encountered during the operation of high performance jet and rocket aircraft.

Although the present invention has been described with particular reference to specific embodiments thereof, the invention is not to be considered as limited thereto, but includes within its scope such modifications and alterations as come within the appended claims.

What is claimed is:

1. The method of joining metallic members comprising the steps of applying a film of ceramic adhesive to a surface of each of said metallic members, drying said adhesive, superimposing a metal space screen carrier on the filmed surface of one of said metallic members, assembling said other metallic member in juxtaposed relation to said first member with said screen carrier therebetween such that said screen carrier and metallic members are in pressure contact, heating said assembly to a temperature of about 1000° F. to 2000° F. and simultaneously subjecting said assembly to a pressure of about 50 p.s.i. for a period of about 20 minutes to interfuse said ceramic adhesive in order to effectuate the bonding of said metallic members, and cooling said bonded metallic members to room temperature.

2. A method as defined in claim 1 wherein said heat is applied at a temperature of about 1750° F.

3. A method as defined in claim 1 wherein said space carrier is composed of a 28-mesh stainless steel screen.

References Cited in the file of this patent

UNITED STATES PATENTS

| | | |
|---|---|---|
| 2,175,698 | Netz | Oct. 10, 1939 |
| 2,829,062 | Bennett et al. | Apr. 1, 1958 |
| 2,846,325 | Bennett et al. | Aug. 5, 1958 |
| 2,920,785 | Veres | Jan. 12, 1960 |
| 2,964,444 | Lynn | Dec. 13, 1960 |